United States Patent
Shaw, Jr. et al.

(10) Patent No.: US 7,984,125 B2
(45) Date of Patent: Jul. 19, 2011

(54) TECHNIQUES FOR DEPLOYING VIRTUAL MACHINES USING A DHCP SERVER TO ASSIGN RESERVED IP ADDRESSES

(75) Inventors: Robert W. Shaw, Jr., Pembroke, MA (US); Kevin R. Whitney, Peabody, MA (US)

(73) Assignee: Iron Mountain Incorporated, Boston, MA (US)

( * ) Notice: Subject to any disclaimer, the term of this patent is extended or adjusted under 35 U.S.C. 154(b) by 0 days.

(21) Appl. No.: 12/620,105

(22) Filed: Nov. 17, 2009

(65) Prior Publication Data

US 2011/0119382 A1     May 19, 2011

(51) Int. Cl.
G06F 15/177     (2006.01)
G06F 15/173     (2006.01)

(52) U.S. Cl. .................. 709/222; 709/220; 709/223

(58) Field of Classification Search .......... 709/220, 709/222–223
See application file for complete search history.

(56) References Cited

U.S. PATENT DOCUMENTS

| | | | |
|---|---|---|---|
| 6,311,165 B1 | 10/2001 | Coutts et al. | |
| 6,560,642 B1* | 5/2003 | Nurmann | 709/220 |
| 6,788,980 B1 | 9/2004 | Johnson | |
| 7,139,818 B1* | 11/2006 | Kinnear et al. | 709/222 |
| 7,159,016 B2* | 1/2007 | Baker | 709/220 |
| 7,191,438 B2* | 3/2007 | Bryant | 717/176 |
| 7,340,737 B2 | 3/2008 | Ghercioiu et al. | |
| 7,356,679 B1 | 4/2008 | Le et al. | |
| 7,373,661 B2* | 5/2008 | Smith et al. | 726/15 |
| 7,379,857 B2 | 5/2008 | Piesco | |
| 7,409,709 B2* | 8/2008 | Smith et al. | 726/15 |
| 7,536,541 B2 | 5/2009 | Isaacson | |
| 2006/0090136 A1 | 4/2006 | Miller et al. | |
| 2007/0201465 A1* | 8/2007 | Ishiyama et al. | 370/389 |
| 2007/0233698 A1 | 10/2007 | Sundar et al. | |
| 2008/0134175 A1 | 6/2008 | Fitzgerald et al. | |

* cited by examiner

*Primary Examiner* — Hussein A Elchanti
(74) *Attorney, Agent, or Firm* — BainwoodHuang (57) ABSTRACT

An improved technique involves providing a set of reserved address assignments to a DHCP server, each reserved address assignment including a unique MAC address and a reserved IP address which are associated with each other via that reserved address assignment. The technique further involves providing a base virtual machine image and a set of unique MAC addresses, and generating multiple virtual machines from the base virtual machine image and the set of unique MAC addresses. Each virtual machine (i) provides a particular unique MAC address of the set of unique MAC addresses to the DHCP server and obtains a particular reserved IP address from the DHCP server via an exchange of DHCP messages between that virtual machine and the DHCP server, and (ii) operates as a networked standalone computer using the particular unique MAC address and the particular reserved IP address.

22 Claims, 6 Drawing Sheets

FIG. 1

| MAC ADDRESS 80(1) | RESERVED IP ADDRESS 82(1) |
| MAC ADDRESS 80(2) | RESERVED IP ADDRESS 82(2) |
| ⋮ | ⋮ |

TECHNIQUES FOR DEPLOYING VIRTUAL MACHINES USING A DHCP SERVER TO ASSIGN RESERVED IP ADDRESSES

BACKGROUND

To test a server application, a test administrator can run multiple client virtual machines on a smaller number of physical machines. Typically, the test administrator manually configures each client virtual machine with a unique personality. For example, the test administrator may start with a single client virtual machine image and manually hard code that same client virtual machine image with a unique media access control (MAC) address, a unique Internet Protocol (IP) address, a unique system identifier, etc. to form distinct client virtual machines.

For example, suppose that the test administrator has access to five physical machines, and that each physical machine has enough actual resources to effectively run up to five client virtual machines at the same time. In this situation, the test administrator individually custom configures five client virtual machines on each physical machine. As a result, the test administrator is able to create a total of 25 distinct client virtual machines.

To test the server application, the 25 distinct client virtual machines individually communicate with the server application in the same manner as would 25 separate physical machines. Accordingly, using manual virtual machine configuration, the test administrator is able to "individualize" a number of client virtual machines. As a result, the test administrator more closely matches a real world environment but uses a smaller number of physical machines.

SUMMARY

Unfortunately, it is tedious for a test administrator to manually configure virtual machines with unique personalities. Such a task is manually intensive and time consuming. Additionally, such a task is susceptible to user error. Furthermore, for large scale testing, such a task may be impractical for the test administrator to carry out manually.

In contrast to the above-described conventional approach to manually configuring virtual machines with unique personalities, improved techniques involve deploying virtual machines using a Dynamic Host Configuration Protocol (DHCP) server which is enhanced to assign reserved IP addresses to the virtual machines. Such deployment is effective and efficient (e.g., such techniques can be used to deploy thousands of virtual machines). Moreover, such deployment is capable of occurring in an automated manner which is less susceptible to user error.

One embodiment is directed to a method which includes providing a set of reserved address assignments to a DHCP server, each reserved address assignment including a unique MAC address and a reserved IP address which are associated with each other via that reserved address assignment. The method further includes providing a base virtual machine image and a set of unique MAC addresses, and generating multiple virtual machines from the base virtual machine image and the set of unique MAC addresses. Each virtual machine is constructed and arranged to (i) provide a particular unique MAC address of the set of unique MAC addresses to the DHCP server and obtain a particular reserved IP address from the DHCP server via an exchange of DHCP messages between that virtual machine and the DHCP server, the particular reserved IP address being associated with the particular unique MAC address via a particular reserved address assignment of the set of reserved address assignments, and (ii) operate as a networked standalone computer using the particular unique MAC address and the particular reserved IP address.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Improved techniques involve deploying virtual machines using a Dynamic Host Configuration Protocol (DHCP) server which is enhanced to assign reserved Internet Protocol (IP) addresses to the virtual machines. Such deployment is easily capable of generating thousands of individualized virtual machines effectively and efficiently. Furthermore, such deployment is capable of occurring in an automated manner which is less prone to user error.

Figure 1:
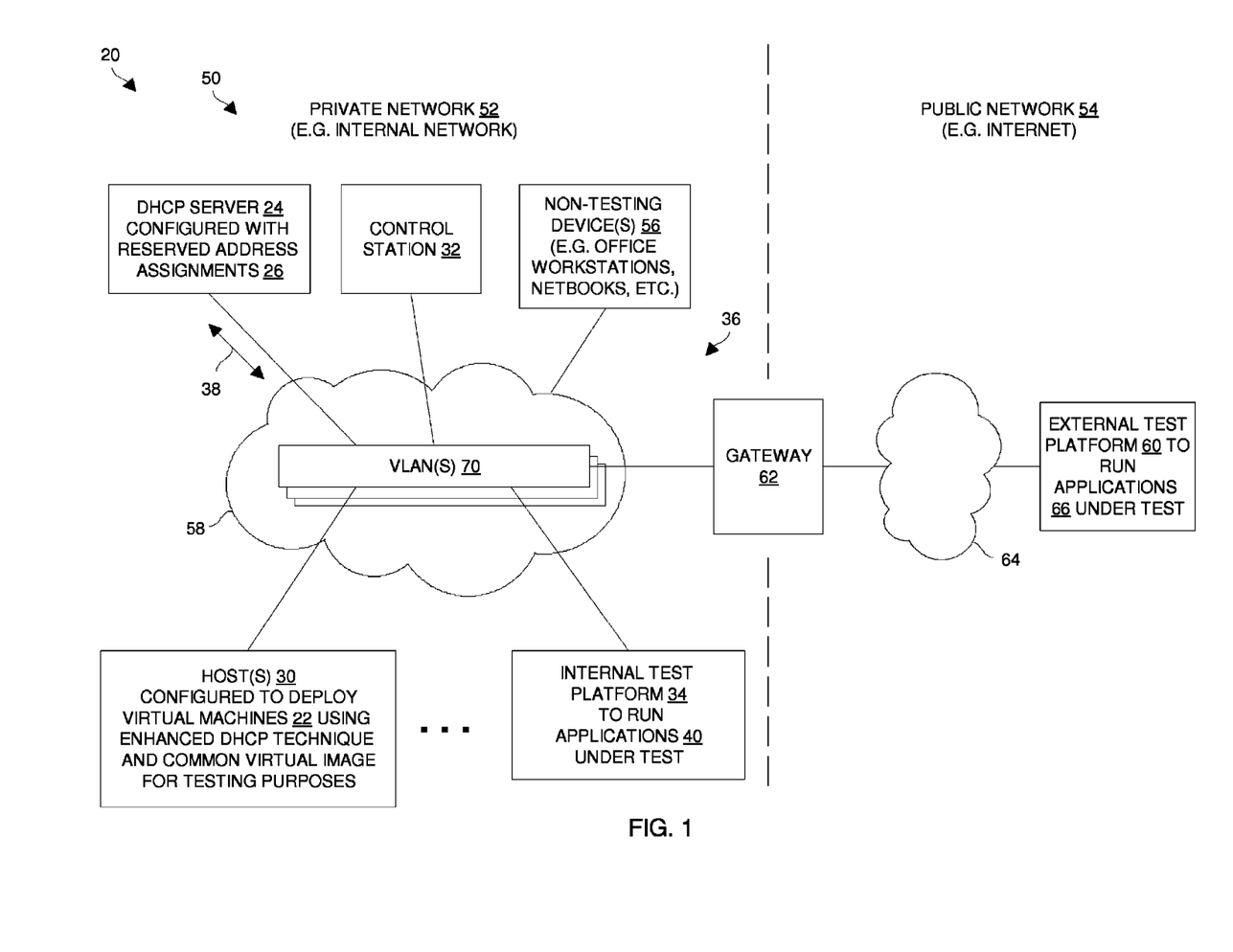
FIG. 1 is a block diagram of a system which deploys virtual machines using a DHCP server configured with a set of reserved address assignments.

FIG. 1 shows a system 20 which deploys individualized virtual machines 22 using a DHCP server 24 which is configured with a set of reserved address assignments 26. The system 20 further includes a set of hosts 30 (i.e., a pool of physical machines), a control station 32, a test platform 34, and communications medium 36. The communications medium 36 may include a variety of network cables and components (e.g., switches, routers, fiber optic devices, wireless devices, combinations thereof, etc.).

The control station 32 is constructed and arranged to control the operation of the DHCP server 24 and the pool of hosts 30. In particular, at startup, the DHCP server 24 boots and the control station 32 inputs the set of reserved address assignments 26 into the DHCP server 24, e.g., an arrow 38 in FIG. 1 illustrates an exchange of electronic signals over the communications medium 36. Each reserved address assignment 26 associates a reserved (or predefined) IP address with a unique MAC address. In contrast to traditional DHCP which assigns IP addresses to DHCP clients from a pool of available IP addresses, the DHCP server 24 is now equipped to assign particular reserved IP addresses which are specifically tied to particular MAC addresses via the assignments 26. Such operation imposes a level of control which, as will be discussed in further detail shortly, enables the system 20 to enjoy certain advantages such as test repeatability and the ability to implement isolated VLANs to control traffic patterns.

Once the DHCP server 24 is loaded with the set of reserved IP addresses 26, the control station 32 directs the hosts 30 to start the virtual machines 22. In particular, the control station 32 loads each virtual machine with a unique MAC address and staggers the startup so that the virtual machines 22 incrementally begin operation, as DHCP clients, at a more or less even pace. As will be explained in further detail shortly, the hosts 30 generate the virtual machines 22 from common guest operating system images which are set to carry out an automated self configuration process. In particular, multiple Windows virtual machines 22 are generated from a single base Windows virtual machine image which has a preinstalled Windows operating system that is automatically self configuring at startup. Similarly, multiple Linux virtual machines 22 are generated from a single base Linux virtual machine image which has a preinstalled Linux operating system that is automatically self configuring at startup.

In this environment, the machine running the DHCP server 24 or the control station 32 may be provisioned to further operate as a Domain Name System (DNS) server. Alternatively, DNS service may be obtained from a separate machine.

As the virtual machines 22 begin operation, the virtual machines 22 carry out a DHCP message exchange with the DHPC server 24. In particular, the virtual machines 22 provide their unique MAC addresses and obtain respective reserved IP addresses from the DHCP server 24 via exchanges of DHCP messages as part of their self-configuration process. Accordingly, the virtual machines 22 are able to acquire unique personalities in an automated manner.

Next, under direction of the control station 32, the virtual machines 22 perform operations to test one or more applications 40 running on the test platform 34. In particular, the virtual machines 22 run agents (or daemons) which are controlled by the control station 32 to operate as individual networked standalone computers. As will be explained in further detail shortly, the agents are able to run a variety of control scripts which simulate real users in order to accurately test applications 40 on the test platform 34.

It should be understood that the control station 32 is capable of coordinating the startup process in a variety of different ways depending on particular test requirements. For example, the control station 32 can bring up all of the virtual machines 22 on a first host 30 before bringing up all of the virtual machines 22 on a second host 30, and so on. Alternatively, the control station 32 can stagger the startup of the virtual machines 22 among multiple hosts 30 in a round robin or similar distributed manner.

Once the virtual machines 22 are up and running, they are able to provide a workload to test applications in a distributed manner. In particular, the virtual machines 22 may be able to impose a demand on the applications which is equivalent to hundreds or even thousands of physical machines.

By way of example, the environment 50 within which the system 20 operates is partitioned into a private network 52 (e.g., a LAN) and a public network 54 (e.g., the Internet). The DHCP server 24, the hosts 30, the control station 32, the test platform 34 and perhaps other non-testing devices 56 reside on the private network 52 and are capable of communicating via local network resources 58. The public network 54 includes an external platform (or devices) 60 which is reachable via the communications medium 36, e.g., a gateway 62 and additional network resources 64. Accordingly, the system 20 is capable of testing additional applications 66 residing on the public network 54 (e.g., at a third party site).

In some arrangements, the communications medium 36 is preconfigured to support virtual local area networks (VLANs) 70. Accordingly, network traffic can be isolated to particular network segments of the communications medium 36. Thus, traffic associated with testing the applications 40/66 provides minimal interference, if any, to the non-testing devices 56. Similarly, traffic from the non-testing devices 56 provides minimal interference, if any, to the devices associated with testing the applications 40/66. Further details will now be provided with reference to FIG. 2.

Figure 2:
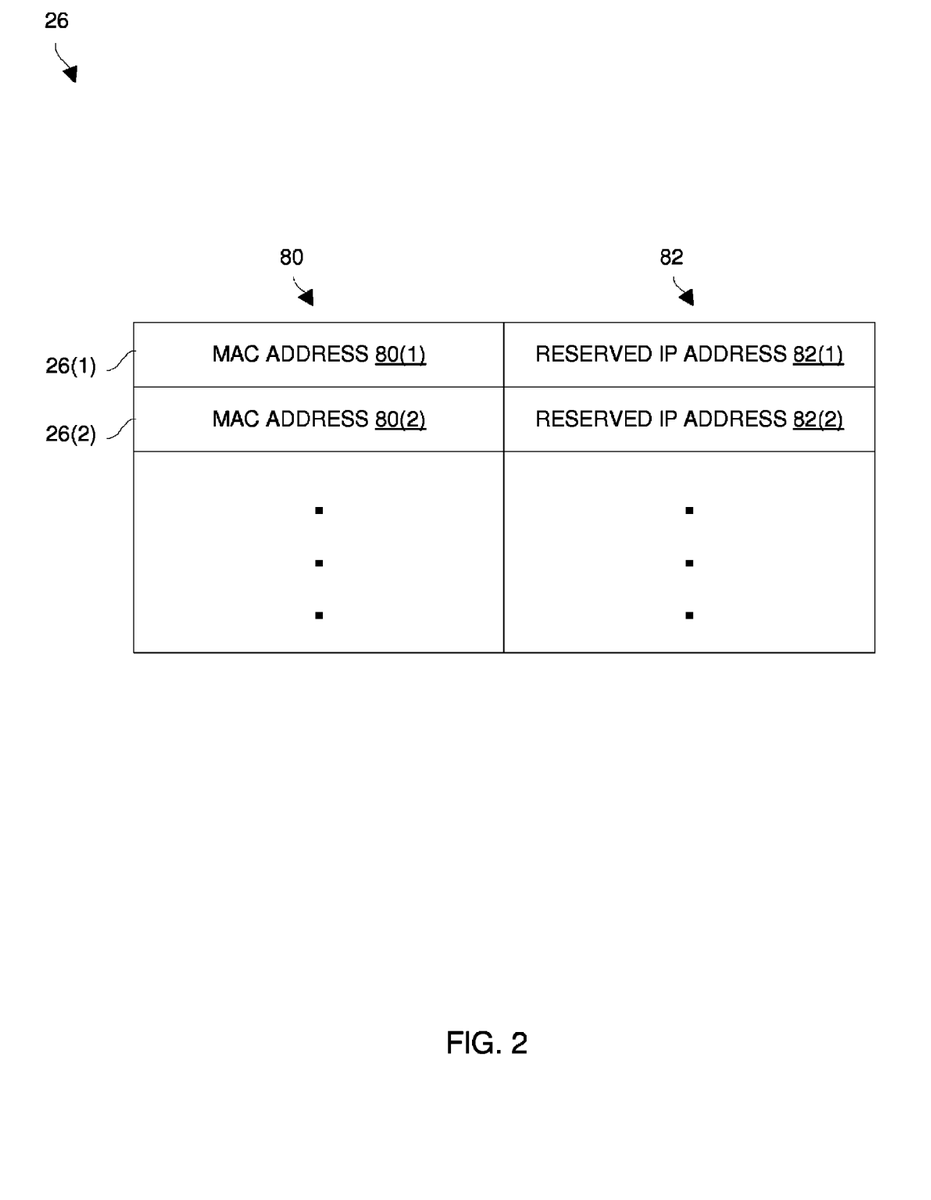
FIG. 2 is a block diagram of the set of reserved address assignments utilized by the DHCP server.

FIG. 2 shows the set of reserved address assignments 26 which is initially stored in the control station 32, and then input into the DHCP server 24 during system startup. Ideally, the control station 32 maintains the set of reserved address assignments 26 as a list which covers each and every machine in the isolated network in a format suitable for importing into the DHCP server 24 as a 'reservation'.

As shown in FIG. 2, each reserved address assignment 26 includes a MAC address 80 and a reserved IP address 82 which are associated with each other via the assignment 26. In particular, an assignment 26(1) includes a MAC address 80(1) and a reserved IP address 82(1), i.e., a MAC and IP address pair. Additionally, an assignment 26(2) includes a MAC address 80(2) and a reserved IP address 82(2) (i.e., another MAC and IP address pair), and so on. The MAC addresses 80 are unique across the entire LAN environment, and cannot be reused within the LAN.

As mentioned earlier, the reserved address assignments 26 enable the DHCP server 24 to assign reserved IP addresses to the virtual machines 22 rather than assign IP addresses from a pool. In particular, when the DHCP server 24 receives a request for an IP address from a virtual machine 22 (i.e., a DHCP client), the DHCP server 24 reads the unique MAC address 80 of the virtual machine 22 from the request and finds the particular reserved address assignment 26 for that unique MAC address 80. The DHCP server 24 then assigns the reserved IP address 82 associated with that unique MAC address 80 to the virtual machine 22 (also see the electronic signals 38 in FIG. 1). Accordingly, the reserved IP addresses 82 are now assigned to the virtual machines 22 via the assignments 26.

Such operation imposes a level of control which enables the system 20 to enjoy certain advantages. For example, each virtual machine 22 is able to receive a specific reserved IP address 82 thus providing test repeatability and consistency. Additionally, coordination of the reserved IP addresses 82 enables the system 20 to implement isolated VLANs 70 to control traffic patterns among the various network segments. Moreover, the various devices within the private network 52 are able to communicate with each other as well as with devices on the public network 54 (e.g., using network address translation).

In some arrangements, the system 20 performs tests of multiple platforms and/or applications simultaneously over different VLANs 70. In these arrangements, the system 20 is able to provide instantiated isolated environments which are identical except for the generated machine names and addresses. Further details of the hosts 30 will now be provided with reference to FIG. 3.

Figure 3:
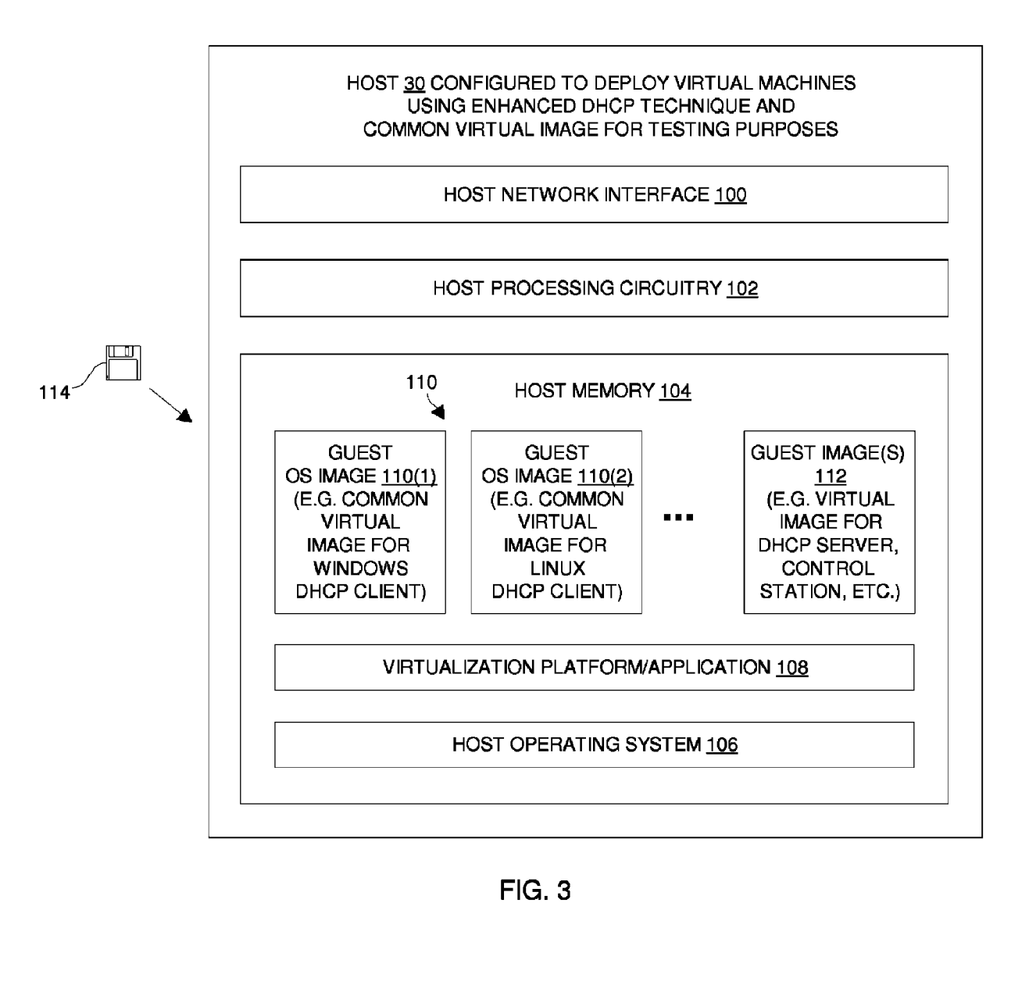
FIG. 3 is a block diagram of a physical machine of the system of FIG. 1.

FIG. 3 shows a host 30 (i.e., a physical machine) of the system 20 which is configured to deploy multiple virtual machines 22 using the earlier-mentioned enhanced DHCP technique. The host 30 includes a host network interface 100, host processing circuitry 102, and host memory 104. The host memory 104 stores a host operating system (OS) 106, a virtualization platform (or application) 108, at least one guest OS image 110, and other guest images 112 (e.g., guest images to run the control station 32 and/or DHCP server 24 as virtual machines if desired).

Each guest OS image 110 is an operating system disk image from which multiple virtual machines 22 can be derived using thin provisioning techniques. Each host 30 preferably is able to retrieve the guest OS images 110 from a common access virtual host library.

During operation, the host processing circuitry 102 runs the host OS 106 and the virtualization platform 108 to create an environment for the virtual machines 22. In particular, the virtual machines 22 are able to access various virtualized resources for robust and reliable operation.

By way of example only, the particular host 30 of FIG. 3 includes multiple guest OS images 110. In particular, the host memory 104 includes a guest OS image 110(1) for virtual machines 22 running the Windows operating system. Similarly, the host memory 104 further includes a guest OS image 110(2) for virtual machines 22 running the Linux operating system. Other operating system images 110 are suitable for use as well. Accordingly, the particular 30 is capable of generating virtual machines 22 running different operating systems.

In some arrangements, the guest OS images 110 are implemented as *.VMDK files. Each guest OS image 110 is equipped with network access, has DHCP and DNS enabled, and has a control agent (or daemon process) installed to communicate with the control station 32.

It should be understood that other hosts 30 may have only one guest OS image 110. For example, one host 30 may have only a guest Windows OS image 110(1) and thus be able to generate only Windows virtual machines 22. Likewise, another host 30 may have only a guest Linux OS image 110(2) and thus be able to generate only Linux virtual machines 22, and so on.

In some arrangements, the host memory 104 further includes one or more guest images 112 to generate, as virtual machines 22, other devices of the system 20. For example, the control station 32 and/or the DHCP server 24 can be implemented as virtual machines 22 rather than as physical machines.

It should be understood that one or more of the software constructs stored in the host memory 104 can be delivered to the host 30 in the form of a computer program product 114 (illustrated generally by a diskette icon 114 in FIG. 3). Such a computer program product 114 can include computer readable media for storing instructions which are executed by the host processing circuitry 102. Examples of suitable computer readable media include tangible articles of manufacture and apparatus such as CD-ROM, flash memory, disk memory, tape memory, and the like. Further details will now be provided with reference to FIG. 4.

Figure 4:
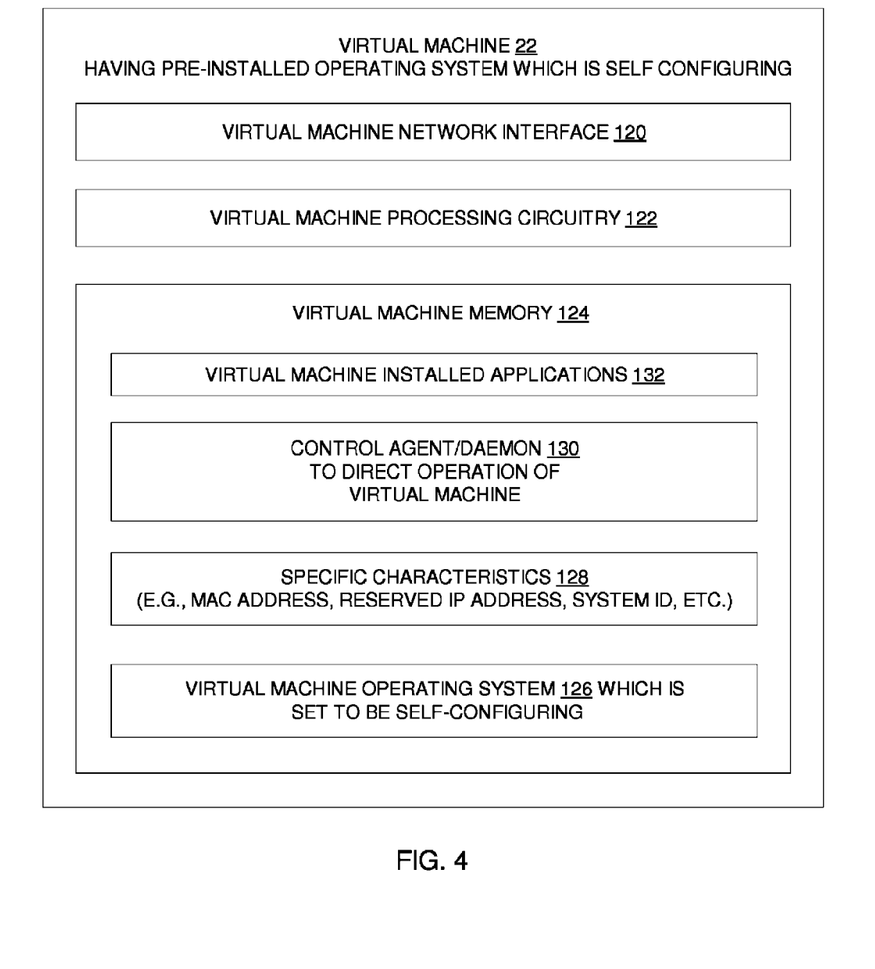
FIG. 4 is a block diagram of a virtual machine of the system of FIG. 1.

FIG. 4 is a block diagram of a virtual machine 22 which is generated from one of the guest OS images 110 (also see FIG. 3). As shown in FIG. 4, the virtual machine 22 includes a virtual machine network interface 120, virtual machine processing circuitry 122, and virtual machine memory 124. The virtual machine memory 124 stores a virtual machine operating system 126, specific characteristics 128, a control agent (or daemon) 130, and virtual machine installed applications 132.

The virtual machine operating system 126 is preset to be self-configuring. That is, the virtual machine operating system 126 is generated from a shared base OS image (e.g., one of the guest OS images 110 in FIG. 3) and is configured to automatically gather personality information from various components of the system 20 (e.g., a unique MAC address, a reserved IP address, a system ID, etc.). Along these lines, the control agent/daemon 130 is constructed and arranged to communicate with the control station 32 (FIG. 1) and carry out commands from the control station 32 in a manner similar to a traditional user exchange with a physical machine via I/O peripherals such as an actual keyboard/mouse, etc.

As briefly mentioned earlier, the guest OS images 110 are set to be self configuring. That is, each guest OS image 110 is prepared to self install (re-initiate) on first boot (e.g., using 'sysprep' for the Windows operating system, and run once scripting in the case of a non-Windows operating system such as Linux). As a result, based on startup communications with the control station 32, the virtual machine 22 dynamically acquires a unique MAC address 80 and assigns itself a new name on first boot. Next, the virtual machine 22 automatically carries out a DHCP message exchange with the DHCP server 24 to obtain a reserved IP address 82 associated with the unique MAC address 80. In an automated manner, the virtual machine 22 may perform other personality gathering operations via an exchange between the control agent/daemon 130 and the control station 32 such as obtain a system ID, a system name, etc.

Once the virtual machine 22 has obtained its specific characteristics 128, the control agent/daemon 130 launches the locally installed applications 132 which enable the virtual machine 22 to communicate with other devices. For example, the locally installed applications 112 may communicate with and test particular features of applications 40/66 running on the test platforms 34/60 (FIG. 1). Further details will now be provided with reference to FIG. 5.

Figure 5:
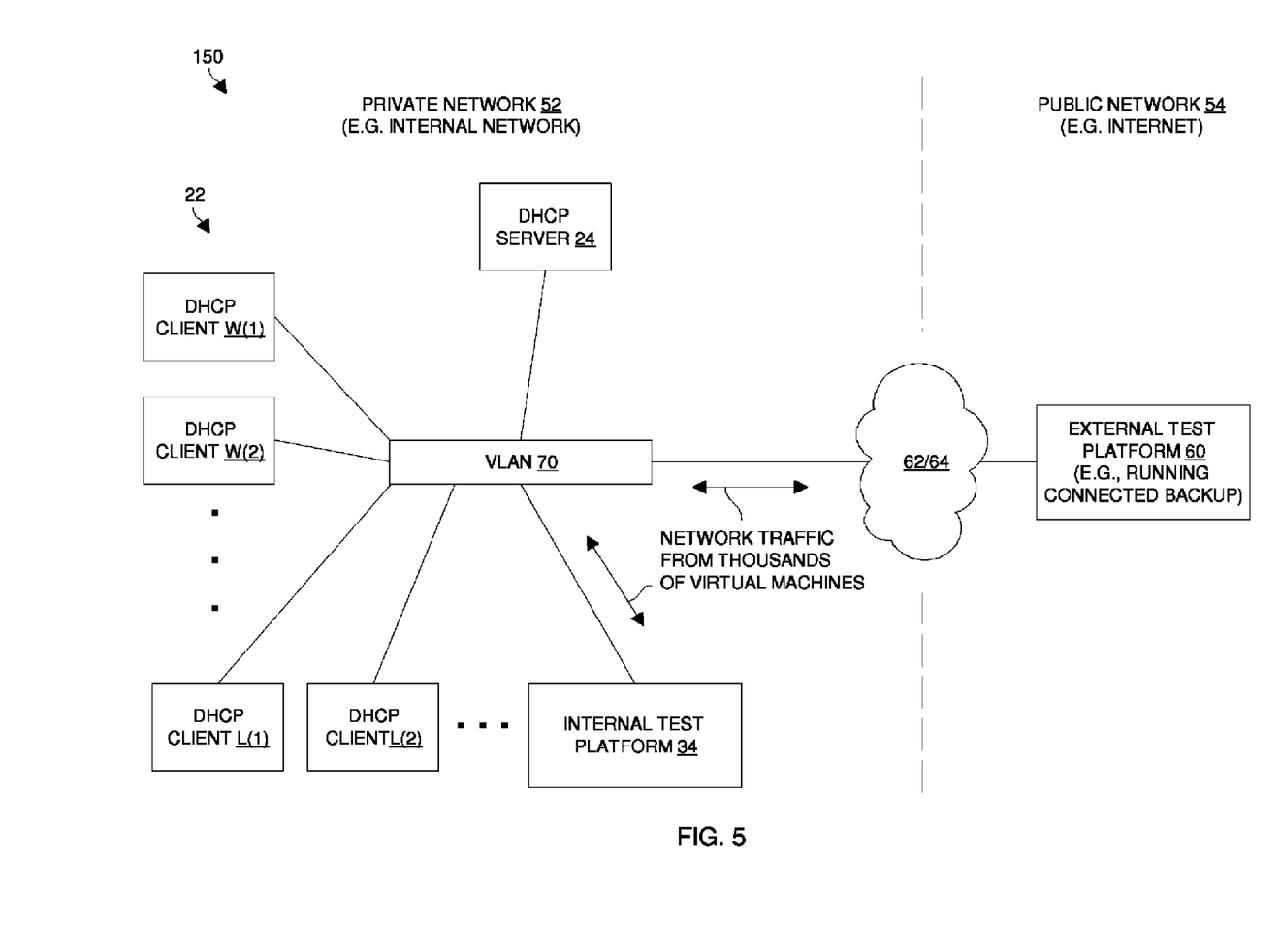
FIG. 5 is a block diagram of the system of FIG. 1 from the perspective of the deployed virtual machines operating over a VLAN.

FIG. 5 shows the environment 150 which is created by the system 20 once the virtual machines 22 have been deployed. As shown, the environment 150 includes multiple Windows DHCP clients W(1), W(2), . . . generated from the base Windows OS image 110(1) (also see FIG. 3). Environment 150 further includes multiple Linux DHCP clients L(1), L(2), . . . generated from the base Linux OS image 110(2) (FIG. 3). Virtual machines 22 running other operating systems are suitable for use as well. The particular operating system distribution for virtual machines 22 is capable of being defined for particular tests.

It should be understood that the system 20 scales easily and is capable of deploying hundreds or even thousands of virtual machines 22 in an automated and repeatable manner. Accordingly, the applications running on the test platforms 34/60 (also see FIG. 1) enjoy large scale testing.

It should be further understood that the same hosts 30 (FIG. 1) are capable of generating another virtual machine environment 150 (FIG. 5) over another VLAN 70. That is, by planning and coordinating operation of the various devices of the communications medium 36 and smartly assigning the reserved IP addresses 82 among the virtual machines 22, the system 20 is able to generate and operate multiple environments 150 concurrently. Accordingly, the system 20 is able to carry out multiple tests utilizing the same hosts 30. Further details will now be provided with reference to FIG. 6.

Figure 6:
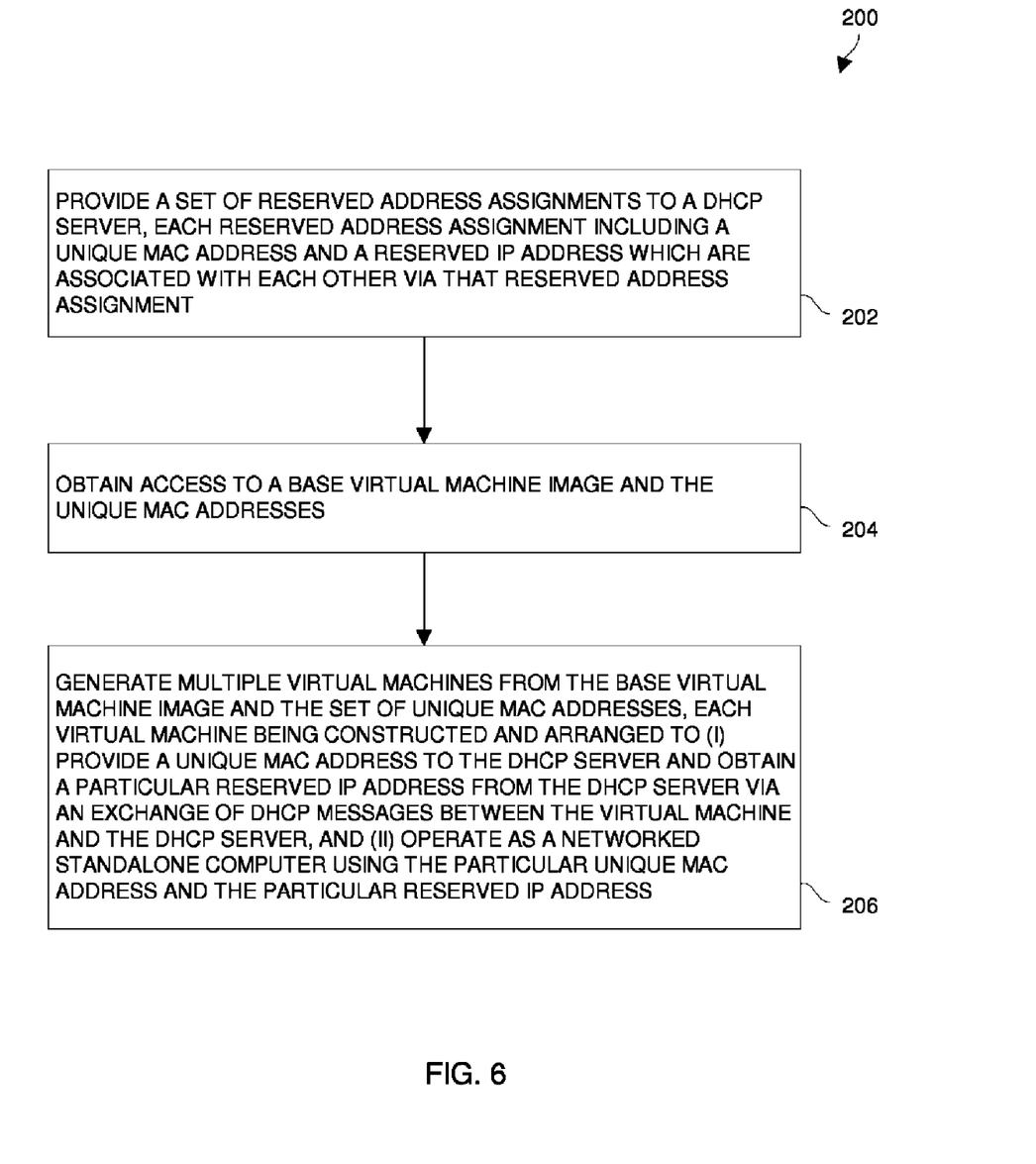
FIG. 6 is a flowchart of a procedure which is performed by the system when deploying the virtual machines using the DHCP server.

FIG. 6 is a flowchart of a procedure 200 which is performed by the system 20 when deploying the virtual machines 22 using the DHCP server 24 in the above-described augmented manner. In step 202, the control station 32 provides a set of reserved address assignments 26 to the DHCP server 24 (FIG. 1). That is, the control station 32 loads the assignments 26 as reservations into the DHCP server 24. Each reserved address assignment 26 includes a unique MAC address 80 and a reserved IP address 82 which are associated with each other via that reserved address assignment 26 (FIG. 2).

In step 204, a host 30 obtains access to a base virtual machine image 110 and the unique MAC addresses 80. If virtual machines 22 running different operating systems are desired, the host 30 can be supplied with different base virtual machine images, i.e., one image for each operating system. Recall that, as described above in connection with FIG. 3, each virtual machine image has an operating system which is set to be self configuring. Accordingly, as a virtual machine 22 starts up, the virtual machine 22 communicates with the DHCP server 24 to obtain a reserved IP address 82, as well as perhaps other personality information from the control station 32.

In step 206, the host 30 generates multiple virtual machines 22 from the base virtual machine image 110 and the set of unique MAC addresses 80. Each virtual machine 22 is constructed and arranged to provide a particular unique MAC address 80 to the DHCP server 24 and obtain a particular reserved IP address 82 from the DHCP server 24 via an exchange of DHCP messages between that virtual machine 22 and the DHCP server 24. The particular reserved IP address 82 is associated with the particular unique MAC address 80 via a particular reserved address assignment 26. Each virtual machine 22 is further constructed and arranged to operate as a networked standalone computer using the particular unique MAC address 80 and the particular reserved IP address 82. For example, based on control from the control station 32, each virtual machine 22 is able to carry out a series of operations to test/exercise applications 40/66 running on the platforms 34/60.

As described above, improved techniques involve deploying virtual machines 22 using a DHCP server 24 which is enhanced to assign reserved IP addresses 82 to the virtual machines 22. Such deployment is effective and efficient and is well suited for large scale purposes (e.g., such techniques can be used to deploy thousands of virtual machines 22). Furthermore, such deployment is capable of occurring in an automated manner which is less susceptible to user error.

With the system 20, disk storage requirements can be significantly reduced as virtual machines 22 are generated from a single base operating system disk image. Additionally, development overhead and replication time is reduced via automated deployment of personality information using the augmented DHCP server 24. Furthermore, the environment is controllable and reproducible via IP address assignment and VLAN isolation. Along these lines, system operation is consistent and repeatable, and users are able to build and deploy large environments that are catalogued and predictive in nature.

While various embodiments of the invention have been particularly shown and described, it will be understood by those skilled in the art that various changes in form and details may be made therein without departing from the spirit and scope of the invention as defined by the appended claims.

For example, it should be understood that, depending on the processing power requirements of a particular test, a host 30 may be capable of generating the entire private network 52 of the environment 150 internally (also see FIG. 5). In such a situation, the VLAN 70 and the internal test platform 34 are also implemented within the host 30 virtually. As a result, only actual network communications to the network segments 62/64 leaves the host 30.

Additionally, it should be understood that the system 20 was described above in the context of deploying virtual machines 22 to test applications 40/66 running on test platforms 34/60 (FIG. 1). It should be understood that the above-described deployment techniques are suitable for use in other contexts as well. In particular, the above-described techniques are well suited for any large scale deployment of reserved IP addresses. For example, in some situations, users of thinly provisioned computerized devices such as netbooks, tablets, or other remote devices are able to acquire reserved IP addresses from the DHCP server 24 for smart coordination of network traffic, e.g., flexibility and isolation of traffic through various network segments (see the non-testing devices 56 in FIG. 1).

Furthermore, particular features of the system 20 may be implemented in other non-testing situations such as distributed data generation (e.g., an "army of ants" performing distributed shared calculations), product demoing, cloud computing for supporting remote office/desktop, and so on. Such modifications and enhancements are intended to belong to various embodiments of the invention.

What is claimed is:

1. A system to deploy virtual machines, the system comprising:
    a Dynamic Host Configuration Protocol (DHCP) server constructed and arranged to receive a set of reserved address assignments, each reserved address assignment including a unique media access control (MAC) address and a reserved Internet Protocol (IP) address which are associated with each other via that reserved address assignment; and
    a set of hosts coupled to the DHCP server, the set of hosts being constructed and arranged to:
        maintain a base virtual machine image,
        receive a set of unique MAC addresses, and
        generate multiple virtual machines from the base virtual machine image and the set of unique MAC addresses, each virtual machine being constructed and arranged to (i) provide a particular unique MAC address of the set of unique MAC addresses to the DHCP server and obtain a particular reserved IP address from the DHCP server via an exchange of DHCP messages between that virtual machine and the DHCP server, the particular reserved IP address being associated with the particular unique MAC address via a particular reserved address assignment of the set of reserved address assignments, and (ii) operate as a networked standalone computer using the particular unique MAC address and the particular reserved IP address.

2. A system as in claim 1 wherein the set of hosts, when maintaining the base virtual machine image, is constructed and arranged to:
    utilize, as the base virtual machine image for generating the multiple virtual machines, an operating system disk image which is preset for self configuration.

3. A system as in claim 1 wherein the DHCP server is formed by a virtual machine running on a physical machine, the DHCP server being constructed and arranged to assign reserved IP addresses based on the set of reserved address assignments.

4. A system as in claim 1, further comprising:
    a platform which runs an application under test, the virtual machines being constructed and arranged to test the application under test.

5. A system as in claim 4 wherein the set of hosts includes:
    a first physical machine which runs a first group of virtual machines, and
    a second physical machine which runs a second group of virtual machines, the first and second groups of virtual machines being configured to impose a workload on the application under test in a distributed manner.

6. A system as in claim 1, further comprising:
    a set of thinly provisioned computerized devices coupled to the DHCP server through a network, each thinly provisioned computerized device being constructed and arranged to obtain a reserved IP address from the DHCP server based on a unique MAC address of that thinly provisioned computerized device.

7. A system as in claim 1 wherein the set of hosts is a set of actual physical machines running host operating systems; and wherein each virtual machine is an emulation of a separate computer, the emulation existing in an environment provided by the set of actual physical machines running the host operating systems.

8. A method of deploying virtual machines, the method comprising:
providing a set of reserved address assignments to a Dynamic Host Configuration Protocol (DHCP) server, each reserved address assignment including a unique media access control (MAC) address and a reserved Internet Protocol (IP) address which are associated with each other via that reserved address assignment;
providing a base virtual machine image and a set of unique MAC addresses; and
generating multiple virtual machines from the base virtual machine image and the set of unique MAC addresses, each virtual machine being constructed and arranged to (i) provide a particular unique MAC address of the set of unique MAC addresses to the DHCP server and obtain a particular reserved IP address from the DHCP server via an exchange of DHCP messages between that virtual machine and the DHCP server, the particular reserved IP address being associated with the particular unique MAC address via a particular reserved address assignment of the set of reserved address assignments, and (ii) operate as a networked standalone computer using the particular unique MAC address and the particular reserved IP address.

9. A method as in claim 8 wherein providing the base virtual machine image includes:
supplying, as the base virtual machine image for generating the multiple virtual machines, an operating system disk image which is preset for self configuration.

10. A method as in claim 9 wherein the operating system disk image is constructed and arranged to support virtual machines running a first operating system; and wherein the method, further comprises:
supplying, as another base virtual machine image for generating other virtual machines, another operating system disk image which is preset for self configuration, the other operating system disk image being constructed and arranged to support virtual machines running a second operating system which is different than the first operating system.

11. A method as in claim 8, further comprising:
running an application under test, the virtual machines being constructed and arranged to test the application under test.

12. A method as in claim 11 wherein a pool of physical machines is allocated to test the application under test; and wherein generating the multiple virtual machines includes (i) running a first group of virtual machines on a first physical machine of the pool, and (ii) running a second group of virtual machines on a second physical machine of the pool, the first and second groups of virtual machines being configured to impose a workload on the application under test in a distributed manner.

13. A method as in claim 12 wherein running the application under test includes:
executing the application under test on a physical machine which is separate from the physical machines of the pool of physical machines.

14. A method as in claim 13, further comprising:
configuring a network which connects the pool of physical machines and the physical machine which is separate from the physical machines of the pool of physical machines to support a virtual local area network (VLAN);
wherein the reserved IP addresses of the first group of virtual machines map to the VLAN; and
wherein the reserved IP addresses of the second group of virtual machines map to the VLAN.

15. A method as in claim 14 wherein running the application under test includes:
executing the application under test on a platform which maps to the VLAN.

16. A method as in claim 14 wherein running the application under test includes:
executing the application under test on a platform which is external to the VLAN.

17. A method as in claim 14, further comprising:
conveying network traffic between two data communications devices over the network, the network traffic being external to the VLAN.

18. A method as in claim 12, further comprising:
providing a control station which directs operation of each virtual machine of the first group of virtual machines running on the first physical machine and the second group of virtual machines running on the second physical machine.

19. A method as in claim 18, further comprising:
maintaining the set of reserved address assignments on the control station, the control station being constructed and arranged to provide the set of reserved address assignments to the DHCP server prior to generation of the multiple virtual machines.

20. A method as in claim 8, further comprising:
using the set of reserved address assignments provided to the DHCP server, delivering reserved IP addresses to thinly provisioned computerized devices based on unique MAC addresses of the thinly provisioned computerized devices.

21. A method as in claim 8 wherein generating the multiple virtual machines includes:
operating a set of actual physical machines running host operating systems, and
emulating, as each virtual machine, a separate computer, such emulation existing in an environment provided by the set of actual physical machines running the host operating systems.

22. A method of deploying virtual machines, the method comprising:
providing a set of reserved address assignments to a Dynamic Host Configuration Protocol (DHCP) server, each reserved address assignment including a unique media access control (MAC) address and a reserved Internet Protocol (IP) address which are associated with each other via that reserved address assignment;
providing a base virtual machine image and a set of unique MAC addresses; and
generating multiple virtual machines from the base virtual machine image and the set of unique MAC addresses, each virtual machine being constructed and arranged to (i) provide a particular unique MAC address of the set of unique MAC addresses to the DHCP server and obtain a particular reserved IP address from the DHCP server via an exchange of DHCP messages between that virtual machine and the DHCP server, the particular reserved IP address being associated with the particular unique MAC address via a particular reserved address assignment of the set of reserved address assignments, and (ii) operate as a networked standalone computer using the particular unique MAC address and the particular reserved IP address;

wherein providing the base virtual machine image includes supplying, as the base virtual machine image for generating the multiple virtual machines, an operating system disk image which is preset for self configuration;

wherein the operating system disk image is constructed and arranged to support virtual machines running a first operating system; and wherein the method, further comprises:
 supplying, as another base virtual machine image for generating other virtual machines, another operating system disk image which is preset for self configuration, the other operating system disk image being constructed and arranged to support virtual machines running a second operating system which is different than the first operating system, and
 configuring a physical machine to run the DHCP server as a virtual machine, wherein the DHCP server, when running on the physical machine, is constructed and arranged to assign reserved IP addresses based on the set of reserved address assignments.

* * * * *